Patented May 11, 1937

2,079,638

UNITED STATES PATENT OFFICE 2,079,638

PROCESS FOR PURIFYING CAUSTIC

Carl Sundstrom, Syracuse, N. Y., assignor to The Solvay Process Company, Syracuse, N. Y., a corporation of New York No Drawing. Application June 7, 1932, Serial No. 615,945

8 Claims. (Cl. 23—184)

This invention relates to the purification and clarification of alkaline solutions and is especially concerned with the removal of colloidal or suspended matter, such as ferric hydroxide, from sodium hydroxide solutions.

Caustic alkalis, such as sodium hydroxide, are customarily manufactured and sold either as solids or as solutions containing about 50 per cent or perhaps a little less of the alkali. The solutions are less expensive to prepare than the solid material and are more easily handled since they may be transported by ordinary liquid conveying means, such as tank cars, pipe lines, pumps, etc. whereas the solid caustic requires special care and additional equipment.

In the past, however, the commercial caustic solution has not been found satisfactory for certain uses, such for example as the preparation of 18 to 20 per cent sodium hydroxide solution for use in the viscose process, and consequently the solid caustic has been employed for these purposes. Because of the cost of the preparation of the solid caustic as well as the difficulties in handling it, the employment of the commercial caustic solutions would be preferable if these solutions were suitable for use in the above processes. The objectionable qualities of these solutions appear to be due to certain impurities which are contained therein in a suspended or perhaps colloidal state, and are not removed by ordinary filtration of the liquid. Among these impurities certain metallic hydroxides, especially ferric hydroxide, have been found to be particularly objectionable.

It is an object of the present invention to effect the removal of such impurities from caustic solutions, thus making available for various purposes many commercial caustic solutions which up to the present have been found unsatisfactory for these purposes.

Further objects will appear from the following description of my invention.

According to the process of the present invention the caustic solution to be purified is treated with a compound of magnesium producing a precipitate which is permitted to settle out and is then separated from the caustic solution. The precipitate formed appears to consist largely of magnesium hydroxide. The formation of the precipitate and its subsequent settling effect the removal of substantially all of the finely divided matter which otherwise might remain in suspension even after an extended settling period.

Whether the process of purification is due entirely to mechanical action of the precipitated particles or whether it is due in part to chemical action is not definitely established. It is believed, however, that the sweeping action of the precipitate is of primary importance. Non-metallic ions such as chloride, nitrate, and sulfide, are less desirable for use in solutions which are subsequently to be employed in the preparation of viscose. It is therefore evident that the process in which the NaOH solution is subsequently to be employed should be given consideration in determining the metal salt most desirable for use in the purification. I prefer to employ magnesium sulfate.

My process is applicable to the purification of caustic solutions of various concentrations. However, as the concentration of an NaOH solution is increased, the viscosity also increases, and with solutions of high concentration, for example 47% NaOH solution, the viscous character of the liquid materially hinders separation of the precipitate. Solutions of a concentration not over about 30 to 35% generally may be purified with facility by my process and the process is especially effective in the purification of sodium hydroxide solutions of about 18 to 20 per cent concentration or less. Preferably the purification is carried out at temperatures below about 50° C.

Since commercial caustic solutions are frequently reduced in concentration as in the viscose process, to around 20 per cent before they are used, I prefer to effect this dilution prior to the purification process. The precipitant may be added to water to form a very dilute solution, and this solution may be used for dissolving solid caustic or for diluting relatively concentrated caustic solutions; or a small amount of the precipitant may be added as a concentrated solution to a caustic solution, thus having substantially no effect on the concentration of the caustic solution. For this reason where in the accompanying claims I employ the term "caustic", unless the term is otherwise limited, I intend to include not only caustic solutions but the undissolved compound as well. The following examples are given to show the advantages of my purification process as compared with calcium hydroxide (Example 2).

*Example 1.*—An 18 per cent NaOH solution was prepared by diluting a commercial 47.5 per cent NaOH solution with water. The solution thus prepared was found to contain 14 parts of $Fe_2O_3$ per million parts of NaOH. To this solution .7 pound of magnesium sulfate per 1000 pounds of NaOH was added, the MgSO₄ being employed as a concentrated aqueous solution. The resultant precipitate was allowed to settle. The clear solution after separation of the precipitate was found to contain 3 parts of Fe₂O₃ per million parts of NaOH.

*Example 2.*—To 600 parts of a commercial 47.5 per cent solution of NaOH, which was found to contain 23 parts of Fe₂O₃ per million parts of NaOH, were added 980 parts of water containing .94 part of CaO to give an 18 per cent NaOH solution. The calcium oxide was allowed to settle and the solution was then separated by decantation. The decanted liquid was found to contain 8 parts of Fe₂O₃ per million parts of NaOH.

In the process of Example 1 above, the precipitate remaining after the separation of the purified solution, constitutes a mud or sludge containing the impurities and also a substantial amount of NaOH solution. If desired, this NaOH may be removed from the mud by washing with water, as by a countercurrent washing treatment, and this water may be used for diluting further quantities of commercial NaOH, so that none of the NaOH is lost in the purification process.

The process has been shown applied to NaOH solutions obtained by diluting commercial 47.5 per cent NaOH solution for such solutions are frequently found to contain an objectionably large proportion of iron. The process is also adapted for the purification of other solutions containing colloidal or suspended matter. It may be used for example, to improve solutions obtained by dissolving commercial solid NaOH in water, in which case solutions of greater purity are produced than are obtainable by merely settling and filtering the solution, and the rate of settling is greatly increased.

In my process it is desirable that the salt be added in relatively small proportion since the excess added merely causes precipitation of the hydroxide and increases the salt content of the solution, whereas the addition of only a small proportion of the salt satisfactorily effects the desired purification.

The terms "suspended matter", "suspended impurities", "suspended compound", and similar expressions employed in the claims are intended to include substances existing in the colloidal state as well as those existing as more coarse suspensions.

I claim:

1. The process for removing a compound of iron from caustic solutions containing it, which comprises adding thereto a sufficient quantity of a soluble salt of magnesium to form a substantial quantity of precipitate but insufficient to react with all of the alkali, and separating the precipitate.

2. The process for separating suspended matter from sodium hydroxide solutions having a concentration of not substantially more than about 35 per cent, which process comprises adding thereto a small proportion of magnesium sulfate solution thus forming a flocculent precipitate of magnesium hydroxide, and separating said precipitate.

3. The process for separating suspended matter from sodium hydroxide solutions having a concentration of about 18 to 20 per cent, which process comprises adding thereto a small proportion of a concentrated solution of magnesium sulfate, thus forming a flocculent precipitate of magnesium hydroxide, and separating said precipitate.

4. The process for purifying caustic solution containing suspended impurities, which comprises adding thereto a sufficient quantity of an aqueous solution of magnesium sulfate to form a substantial quantity of precipitate but insufficient to react with all of the caustic, and separating the precipitate.

5. The process for separating suspended matter from aqueous sodium hydroxide solution, which comprises adding thereto as an aqueous solution a small quantity of magnesium sulfate, thus forming a flocculent precipitate, and separating the precipitate.

6. The process for removing a suspended compound of iron from aqueous sodium hydroxide solution having a concentration of about 18% to 20% NaOH, which comprises adding to the solution a small proportion of concentrated aqueous magnesium sulfate solution, thus forming a precipitate of magnesium hydroxide, and settling the solution to separate said precipitate.

7. The process for removing compounds of iron from aqueous sodium hydroxide solution having a concentration of about 18% to 20%, which comprises adding to the solution at a temperature below about 60° C. a small proportion of a concentrated aqueous magnesium sulfate solution, thus forming a flocculent precipitate of magnesium hydroxide, and settling the solution to separate said precipitate.

8. The process for removing a compound of iron from caustic solution containing it, which process comprises adding thereto a sufficient quantity of an aqueous solution of magnesium sulfate to form a substantial quantity of precipitate but insufficient to react with all of the caustic, and separating the precipitate.

CARL SUNDSTROM.